March 31, 1970 KEIJI SUZUKI ET AL 3,504,115

FM TELEVISION SIGNAL TRANSMISSION SYSTEM

Filed July 26, 1965 5 Sheets-Sheet 1

INVENTORS
Keiji Suzuki
Kozo Hayashi
Hiroshi Tanimura
BY Stevens, Davis, Miller & Mosher
ATTORNEYS INVENTORS
Keiji Suzuki
Kuzo Hayashi
Hiroshi Tanimura
BY Stevens, Davis, Miller & Mosher
ATTORNEYS INVENTORS
Keiji Suzuki
Kozo Hayashi
Hiroshi Tanimura BY Stevens, Davis, Miller & Mosher

ATTORNEYS

INVENTORS
Keiji Suzuki
Kozo Hayashi
Hiroshi Tanimura
BY
Stevens, Davis, Miller & Mosher
ATTORNEYS INVENTORS
Keiji Suzuki
Kozo Hayashi
Hiroshi Tanimura
BY
Stevens, Davis, Miller & Mosher
ATTORNEYS 3,504,115
FM TELEVISION SIGNAL TRANSMISSION SYSTEM Keiji Suzuki, Tokyo, Kozo Hayashi, Zushi, and Hiroshi Tanimura, Tokyo, Japan, assignors to Japan Broadcasting Corporation, Tokyo, Japan
Filed July 26, 1965, Ser. No. 474,805
Claims priority, application Japan, Mar. 25, 1965, 40/16,899
Int. Cl. H04n 7/00, 5/38, 5/04
U.S. Cl. 178—6 19 Claims

ABSTRACT OF THE DISCLOSURE

A television transmission and receiving system for broadcasting television signals over a limited band via a satellite in orbit is shown. The system includes a transmission system in which video and synchronizing signals are given the same polarity, a transponder in the satellite, and a receiver system in which means are provided for separating the synchronizing signal and the video signals and replacing the separating synchronizing signal with one having an opposite polarity with respect to the polarity of the video signal. The system may be provided with means to transmit and means to receive audio signals together with the television signals.

This invention relates to a television signal transmission system relayed by space satellite.

This invention proved the possibility of worldwide live television broadcasting by the success of a sharp television picture transmission from the Olympic Games, 1964 in Tokyo, which succeeded in overcoming extremely unfavorable transmission conditions and relayed sharp television pictures by SYNCOM III, the space communication satellite. More particularly, this invention relates to a further improved system for the simultaneous transmission of a television signal and its sound signal relayed by space satellite. It should be understood that the term "television signal" in this invention means not only usual standard television signal but also includes fascimile signals and the like.

In particular, the invention relates to a transmission system via transmission media wherein an undesirable carrier to noise ratio, i.e., $C/N$ ratio may be avoided such as in case of satellite relayed television signal transmission, in which the repeating equipment of the system, the transponder, is located at a far distant place from the receiving point and further has a very limited transmission band width.

Generally speaking, if the $C/N$ ratio is expected to be in the proximity of its lower threshold level of the system, it is preferred to improve the $C/N$ ratio by decreasing intermediate frequency band width of the receiving equipment. However, in fact, it is rather difficult by a conventional transmission system to obtain a high transmission quality having a high signal-to-noise ratio, i.e., $S/N$ ratio by using a narrow intermediate frequency band for the purpose of improving the $C/N$ ratio.

The principal object of the invention is to provide a novel system for high quality transmission of television signals via a transmission path of very narrowly limited transmission band and under a condition of very low $C/N$ ratio.

Another object of the invention is to provide such a novel system to obtain an improved $S/N$ ratio by making correction of a television signal based on a study of statistical nature of correlations between the transmitted signal amplitude and the response to the human eyesight when disturbed by noises.

A further object of the invention is to provide an improvement in $S/N$ ratio of the television signal by fully utilizing the whole range of the frequency deviation of frequency modulated carrier wave as the full amplitude variation of transmitted television signal.

A still further object of the invention is to improve the $S/N$ ratio of the television signal by means of effectively utilizing the very narrow available transmission band by the maximum frequency deviation of the frequency modulated carrier wave.

According to the invention, said television signal is at first preemphasized prior to the transmission to improve the $S/N$ ratio. Then the peaks occurring in the sharp bending portion of the amplitude of the signal are compressed in amplitude and frequency modulated thereafter. By these means the frequency deviation in the part containing important information of the television signal can be increased and therefore overall improvement of the $S/N$ ratio can be obtained. Due to such processing, comparatively high noise concentration will appear where the brightness of the picture is varied suddenly, however, the inventors have found that said noise concentration hardly gives any interfering effects to human eyesight and hence does not affect the reproduced television picture quality.

In addition, in order to obtain further improvements of the $S/N$ ratio of the television signal by causing as large frequency deviations as possible within the available transmission band, a certain level of the picture signal is always clamped at a constant voltage and thereby a fixed correlation is established between said clamped voltage and its corresponding modulated frequency in the frequency modulated wave.

According to the invention, the polarity of each synchronizing signal included in the television signal is at first converted into positive polarity, and then while limiting the amplitude of thus processed positive polarity synchronizing signal to a certain level which is lower than the maximum amplitude of the picture signal so that the available transmission band width may be fully utilized for the transmission of major information of the picture signal.

In a further aspect of the invention the synchronizing signal portion of thus processed television signal which consists of picture signal and positive polarity synchronizing signal is superposed with a burst wave and then said burst wave is frequency modulated with the sound signal, thus the sound signal is transmitted simultaneously with the picture signal of a television program.

In the case of said live television broadcasting relayed by SYNCOM III, the output power of the transponder carried by satellite was very weak and rated about 2 w. and the satellite was located at a substantially fixed point about forty thousands kilometers above the Earth. The transistor at the fixed transmitting station can be made as a large power of more than 10 kw., however, the signals transmitted to the receiving station repeated by such a small transponder carried by SYNCOM III was very weak and resulting in a low $C/N$ ratio. In view of such poor transmission conditions such as in case of space satellite repeating in which only a limited frequency band width available, it had been generally believed to be extremely difficult or may be impossible to obtain a clear television picture transmission which requires a considerable band width.

The inventors have carried out a series of studies on how to achieve simultaneous high quality transmission of television signal and sound signal via a common channel relayed by satellite provided with a transponder of very low power output and narrowly limited frequency band available. Therefore the system of the invention has to transmit television signal even when the available power of carrier wave is too low to be almost comparative to the noise level. It has been believed that in such a low $C/N$ ratio, the transmitted television signal is greatly deteriorated due to adverse interferences in phase by noises on the carrier wave. Moreover, the sound signal was believed to be transmittable only through a separate transmission channel.

In order to mitigate said difficulties main features of the invention lies in:

(1) To limit transmission band width in an allowable minimum range.

(2) In a conventional transmission system, such a narrow limitation of the transmission band width will inevitably result in deterioration of transmitted television picture quality, however, in accordance with the invention, such deterioration in the television picture can be obviated by converting the ordinary negative polarity synchronizing signal into positive polarity synchronizing signal and thus transmit the television signal by fully utilizing the narrow transmission band. In accordance with said processing of the invention the picture quality can be improved by about 3 db.

(3) In order to transmit sound signal simultaneously with picture signal, substituting the synchronizing signal portion of processed television signal into a burst wave, and the burst wave is frequently modulated with sound signal and then transmitted.

(4) An emphasizing means provided in the transmission path in order to emphasize higher frequency components of the processed television signal and to concentrate noises in such components and to decrease noises in the remaining components thereof, thus the overall $S/N$ ratio of the television signal may be improved, and thereby clear picture of high grade can be obtained.

(5) In thus preemphasized signal sharp peaks will appear in the fringe portions of the picture where its brightness is varied suddenly, therefore by compressing said peaks, it is possible to transmit television signals by means of a transmission path having only a limited frequency band width available. By this means the intercontinental space satellite relayed television transmission was realized, of which satellite provided with a transponder of very limited capacity.

In accordance with one aspect of the invention, the transmission system comprises a means to emphasize high frequency components of the picture signal, a means to compress high peak amplitude portions in thus emphasized signal appearing in response to the fringe portion of the picture where the amplitude varies suddenly in picture signal, and a means to modulate in frequency thus preemphasized and suppressed television signal while clamping a certain level of the signal at a reference frequency in the frequency modulated signal. In an another aspect of the invention the picture transmitting quality may be further improved, by providing additional means to process the negative polarity synchronizing signal associating with the picture signal of ordinary television signal into positive polarity and by limiting the maximum amplitude of such positive polarity synchronizing signal at a level lower than the maximum amplitude of the picture signal of the television signal to be transmitted.

In a still further aspect of the invention, the system for simultaneous transmission of television signal having picture and negative polarity synchronizing signals in conjunction with the sound signal by frequency modulation comprises a means to convert the polarity of said negative polarity synchronizing signal into positive polarity, a means to superpose thus produced positive polarity synchronizing signal with a sinusoidal wave having a certain frequency and to keep the sinusoidal wave level not to exceed the maximum picture signal level and a means to frequency modulate said sinusoidal wave with the sound signal to be transmitted.

In order to reproduce original television signal at the receiving station, a receiving equipment of the system comprises a means to demodulate the received signal, a means to expand the compressed peaks of the signal, a means to deemphasize thus obtained signal, a means to convert said positive synchronizing signal superposed with sinusoidal wave into negative polarity synchronizing signal and recombine thus reproduced negative synchronizing signal with the picture signal and to obtain properly reproduced television signal, and a means to reproduce the original sound signal by demodulating said positive polarity synchronizing signal superposed with sinusoidal wave which is frequency modulated with corresponding sound signal.

The details of the invention will be better understood from the following detailed descriptions and drawings, in which, FIG. 1 is a block diagram illustrating the transmitting equipment of the system according to the invention;

Figure 1:
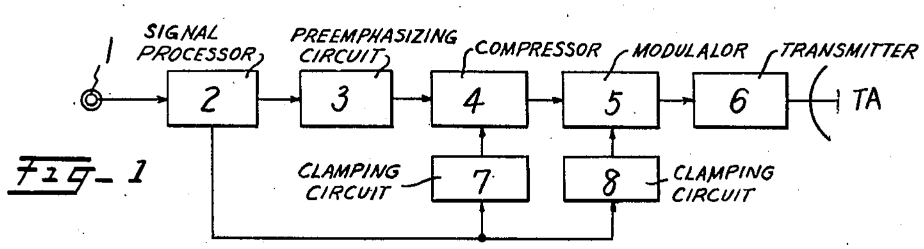
Figure 5:
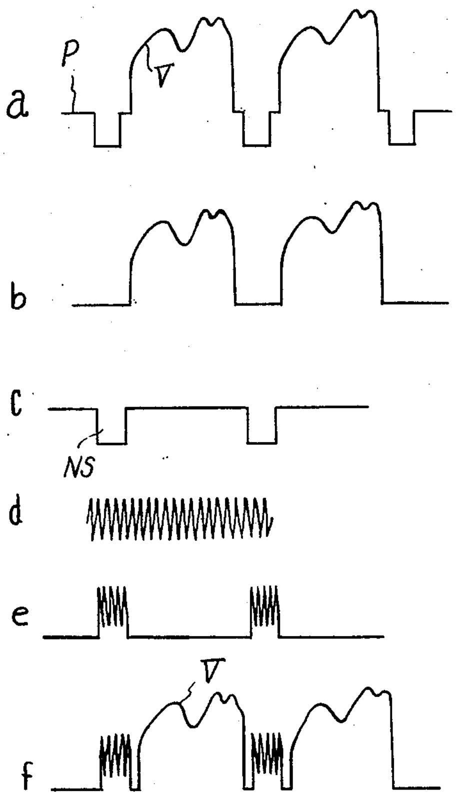
Figure 6:
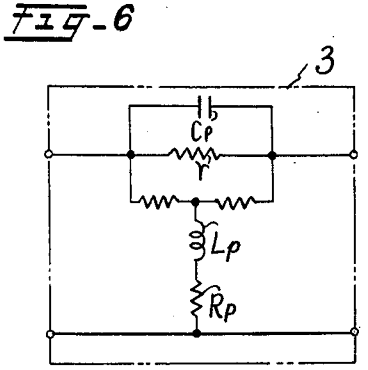
Figure 7:
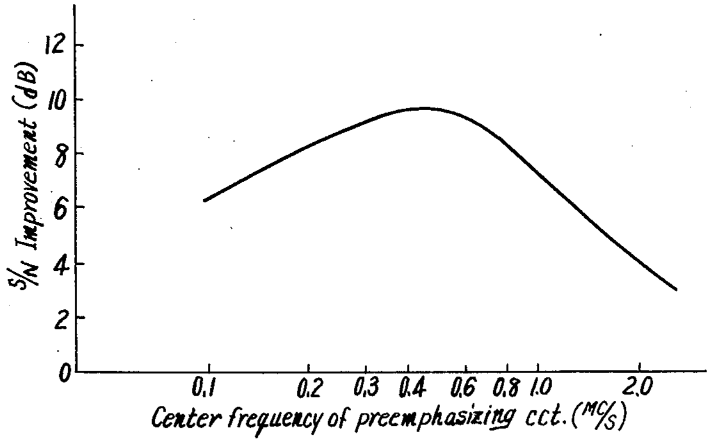
Figure 8:
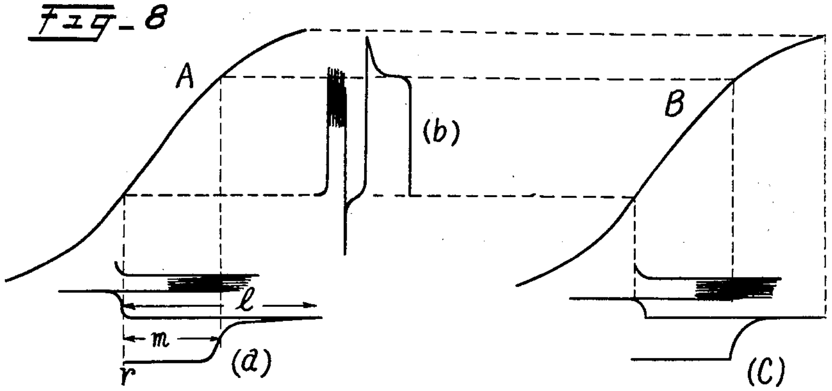
Figure 9:
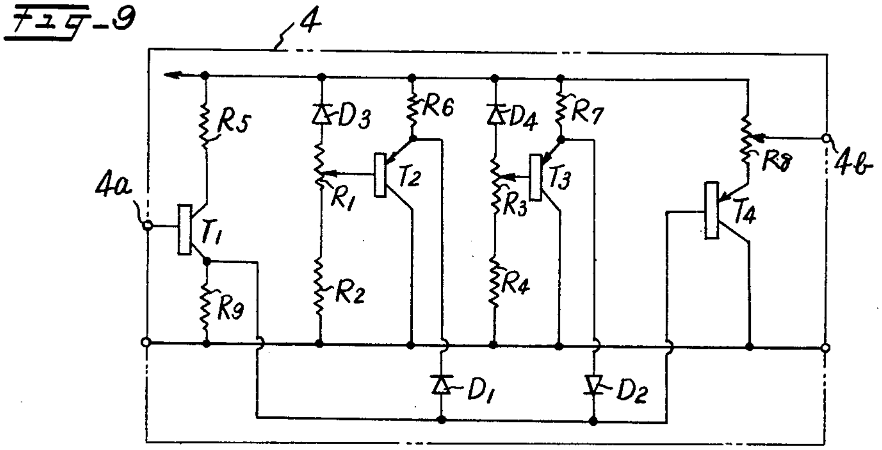
Figure 10:
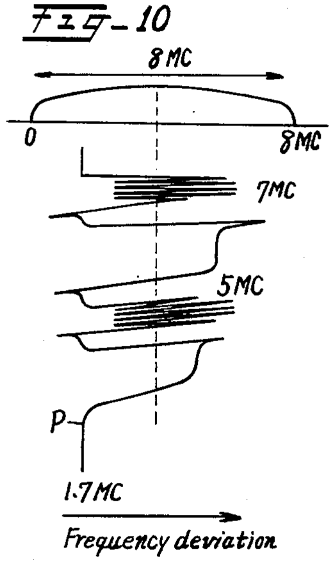
Figure 11:
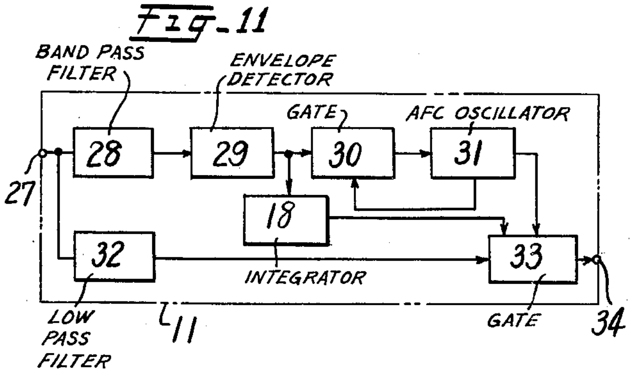
Figure 12:
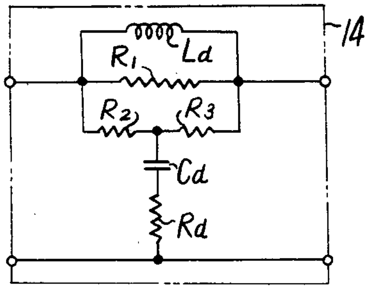
Figure 13:
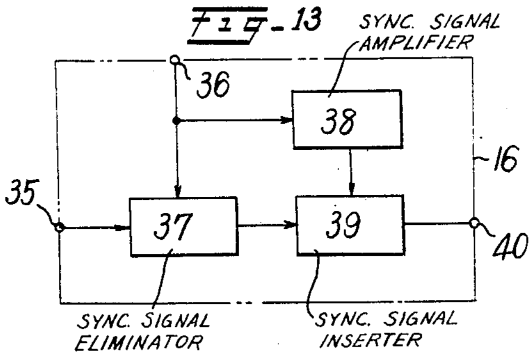
Figure 14:
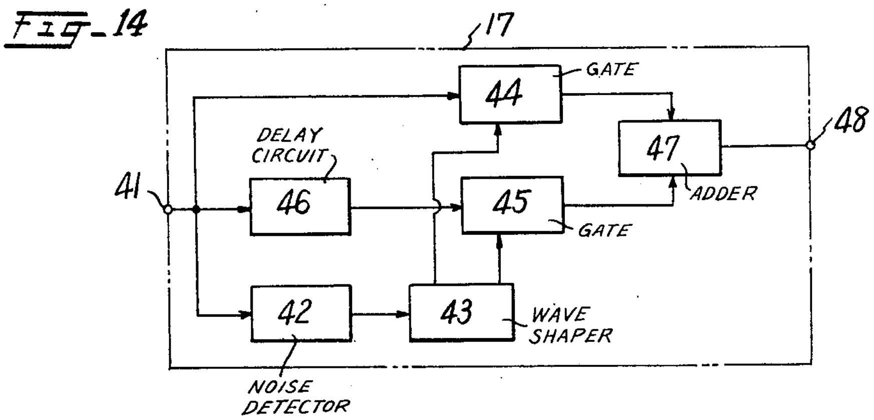
Figure 15:
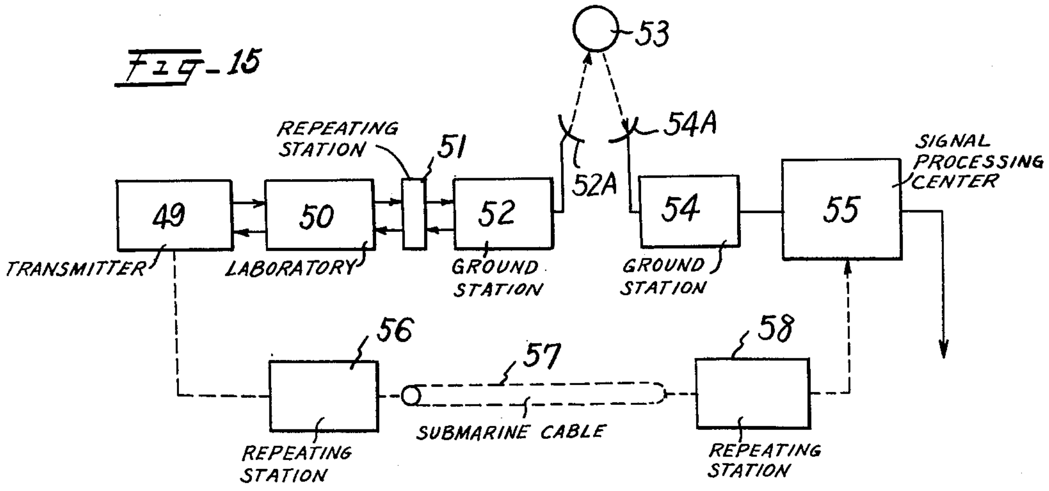
Figure 16:
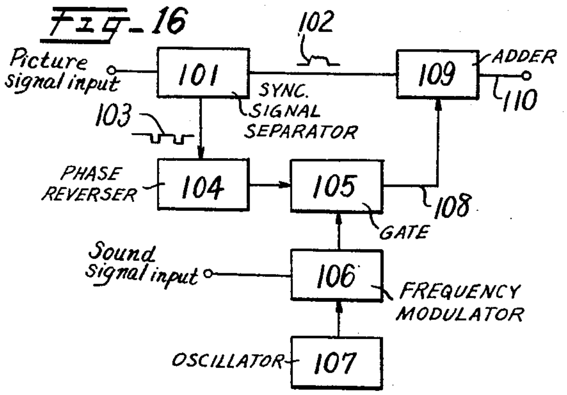
Figure 19:
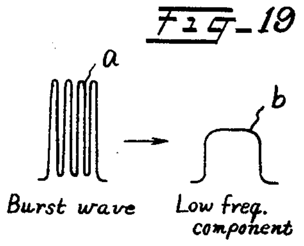
Figures 17, 18:
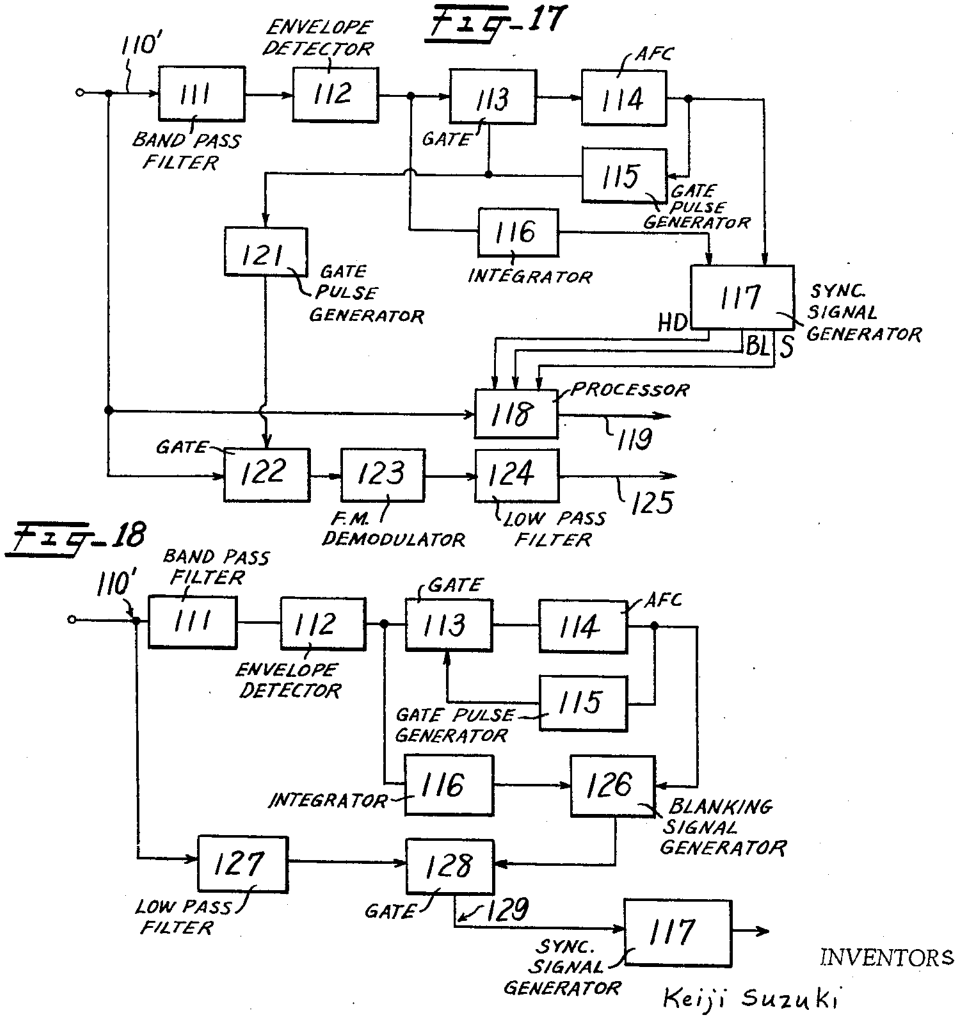

FIGS. 5–*a* to 5–*f* are diagrams illustrating several wave forms of the signals at different stages of the transmitting equipment of FIG. 1;

FIG. 6 is an embodiment of circuit diagram of the preemphasizing circuit;

FIG. 7 is a characteristic diagram illustrating the correlations between the degree of $S/N$ improvement and center frequency of the preemphasizing circuit;

FIG. 8 is a curve diagram illustrating some wave forms of transmitting signal in compressor circuit and expandor circuit;

FIG. 9 is a circuit diagram of an embodiment of compressor circuit;

FIG. 10 is a diagram illustrating the correlations between the processed television signal amplitude and corresponding frequency deviation in frequency modulator;

FIG. 11 is a block diagram of an embodiment of a synchronizing signal separating circuit;

FIG. 12 is a circuit diagram of an embodiment of deemphasizing circuit;

FIG. 13 is a block diagram showing an embodiment of a negative polarity synchronizing signal processor;

FIG. 14 is a block diagram showing a circuit arrangement of an embodiment of a noise killer circuit;

FIG. 15 is a system diagram illustrating the entire satellite communication system of the invention;

FIG. 16 shows a block diagram of processor in transmitting equipment for the simultaneous transmission of sound signal by superposing on positive polarity synchronizing signal according to the invention;

FIG. 17 is a block diagram of corresponding sound signal processor in the receiving equipment;

FIG. 18 is a block diagram of an alternative embodiment of the equipment shown in FIG. 17;

FIG. 19 is a diagram showing correlations between a burst wave and its corresponding low frequency component.

In explaining the invention in further detail, at first a transmission system in which only television signals comprising picture and synchronizing signals is transmitted via the space satellite while sound signal is transmitted through a separate channel, for instance, by submarine cable, will be explained.

Syncom III, a communication satellite boosted up onto a orbit exactly synchronized with the earth's rotation by U.S. Administration on Aug. 19, 1964, carried a transponder having a transmission frequency band width of about 10 mc. Since the communication satellite was positioned at a fixed point in such a long distance from the earth, the output power of the repeating equipment was too weak to transmit a conventional television signal in an allowable $S/N$ ratio for the receiving equipment.

It is well known that the quality of transmitted television picture at least partly depends on the frequency band width of the intermediate frequency amplifier at the receiving equipment.

The inventors found by many experiments that at least 10 db in *C/N* ratio may be required to obtain a satisfactory television picture transmission via Syncom III, and moreover, by limiting an intermediate frequency band within about 8 mc. would result in a *C/N* ratio of about 12 db, therefore 8 mc. intermediate frequency band width was selected for the intermediate frequency of the receiving equipment.

If a more wider intermediate frequency band width is taken at the receiving station, the *C/N* ratio will be deteriorated and if this ratio is decreased lower than 10 db, the amplitude of interfering noise will exceed that of the carrier wave and causes momentary elimination of the carrier wave, which causes white spots with long tails scattered on the reproduced television pictures and extremely deteriorates the transmitted picture quality. In order to mitigate such disadvantages, said selection of intermediate frequency of 8 mc. in the receiving equipment is inevitably requested. Even in such circumstances in accordance with the invention, it is possible to transmit television pictures through a transmission path having a narrowly limited frequency band width in a satisfactory condition.

Referring to FIG. 1 showing a block diagram of the transmitting equipment of the system of the invention, reference numeral 1 represents an input terminal for applying a television signal having conventional negative polarity synchronizing signal, 2 a positive polarity synchronizing signal processor circuit to reverse the polarity of synchronizing signal incorporated with the incoming television signal and to make both the picture and synchronizing signals as a same positive polarity, 3 a preemphasizing circuit, 4 is a compressor circuit to compress amplitudes of peak pulses of thus processed and preemphasized television signal appearing in response to such portions of the picture signal where its amplitude proportional to brightness on the picture varies suddenly to a great extent, 5 a modulator to frequency modulate the carrier wave with thus processed television signal, 6 a transmitter, TA a transmitting antenna to transmit thus modulated wave fed thereto from the modulator 5, and 7 and 8 are clamping circuits to operate in synchronism with the frequency of the synchronizing signal for clamping pedestal level of the television signal at a predetermined voltage level in the compressor circuit 4 and the modulator 5, respectively.

Figures 2, 3:
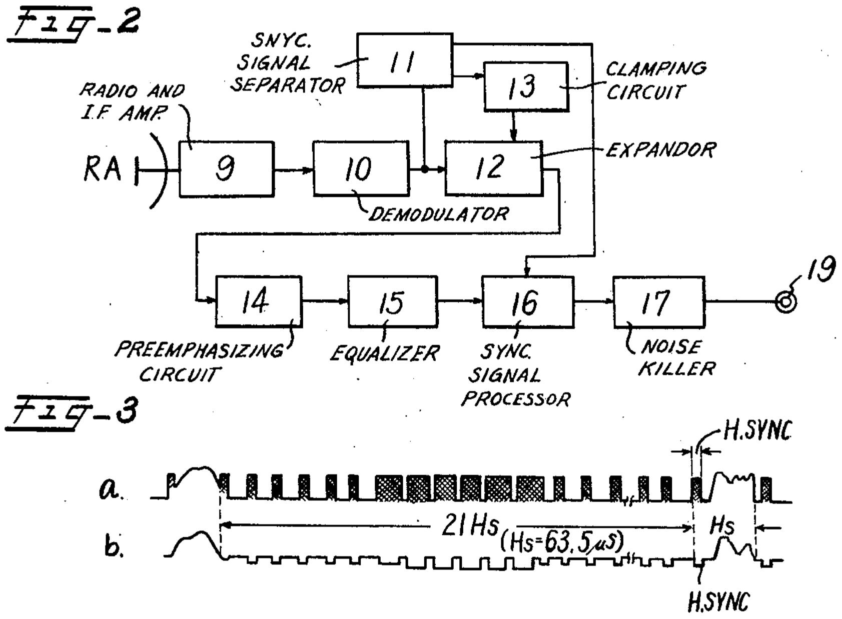
FIG. 2 is a block diagram illustrating the receiving equipment of the system according to the invention.
FIG. 3 shows some wave forms of the signals in the system of the invention.

In transmitting a television signal through a transmission channel having a narrowly limited frequency band width available by means of a frequency modulation, it is desirable to make the modulation index as high as possible to attain a high *S/N* ratio. This means to cause as large frequency deviation as possible for the corresponding part of the necessary amplitude of the picture signal. As one of the means to obtain said highest possible modulation index, i.e., highest frequency deviation, the polarity a synchronizing signal in a conventional television signal which is opposite to that of picture signal as shown in FIG. 3–*b*, is now reversed by the positive polarity synchronizing signal processor 2 and thus processed television signal is shown in FIG. 3–*a*. In this case if the positive polarity synchronizing signal may be separated by the amplitude, the amplitude of the positive polarity synchronizing signal must exceed the maximum amplitude of the picture signal, this results in a disadvantage that more frequency deviations for the peak of the synchronizing signal will be required and the frequency deviation of the picture signal will be decreased, therefore in accordance with the invention the amplitude of the positive polarity synchronizing signal is settled at a value lower than the maximum amplitude of the picture signal.

With the above described processing of the synchronizing signal, it is possible to make the maximum amplitude of the picture signal to correspond with the maximum effective frequency deviation of the frequency modulated wave within available frequency band, thereby the entire frequency band width available in the transmission path by the frequency modulated carrier wave can be fully utilized to represent the picture signal to be transmitted, and accordingly the limited frequency band width such as that of a transponder carried by the space satellite can be utilized most efficiently, and considerable improvement of the *S/N* ratio can be obtained.

Conventional practices have been to allocate 70% of the total allowable range of amplitude variation of the television signal to amplitude variation of picture signal portions thereof and the remaining 30% for synchronizing signal amplitude variation, however, in accordance with the system of the invention, 100% of said total amplitude variation of transmitting signal is now fully available to the amplitude variation of the picture signal which means improvement by about 3 db in *S/N* ratio can be obtained.

On the other hand, said limitation of the positive polarity synchronizing signal amplitude to a level below the maximum amplitude of picture signal inevitably makes it difficult to separate the synchronizing signal at the receiving equipment by the ordinary amplitude separating principle. Therefore, in accordance with the invention a burst wave of 2 mc. is superposed on synchronizing signal of the processed television signal, so that synchronizing signal may be separated out of the received television signal at the receiving equipment by detecting the existence of such burst wave superposed on the signal.

Details of such a separation of burst wave will be described more fully in conjunction with the receiving equipment.

The operative principles of the transmitting station will now be explained in further detail. A television signal coming through the input terminal 1 is applied at first to the positive polarity synchronizing signal processor circuit 2.

Figure 4:
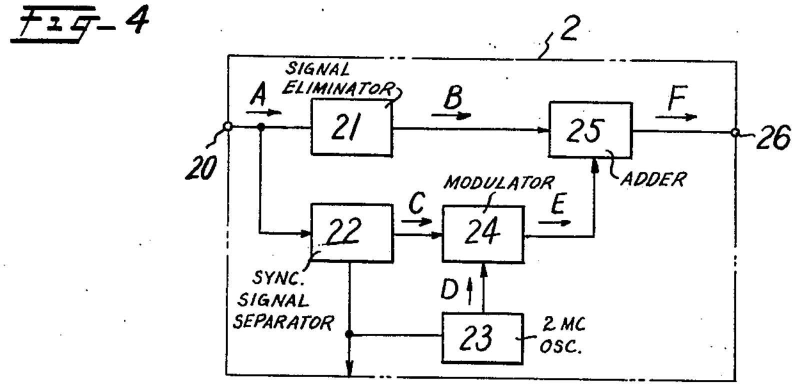
FIG. 4 is a block diagram of a positive polarity synchronizing signal processor.

FIG. 4 shows an embodiment of the positive polarity synchronizing signal processor 2, wherein the synchronizing signal eliminator 21 eliminates the synchronizing signal out of incoming television signal by a suitable means such as a clipper. The synchronizing signal separated by the synchronizing signal separating circuit 22, which is essentially of conventional amplitude separator type, is used in clamping circuits 7 and 8 on the one hand, and also led to a modulator 24 on the other hand in order to superpose 2 mc. burst wave from 2 mc. oscillator 23 thereon.

Since the separated synchronizing signal is in exact synchronism with the original synchronizing signal of the input television signal, the addition thereof by an adder 25 in the output from the synchronizing signal eliminator 21 will result an insertion of synchronizing signal into the original television signal at their original relative position. In carrying out the addition of thus treated synchronizing signal to the television signal, the polarity of the synchronizing signal is adjusted to be the same polarity with that of picture signal.

Thus processed television signal is then fed to the preemphasizing circuit 3.

FIG. 5 shows several wave forms of the signals in the transmitting equipment. FIG. 5–*a* is a wave form of conventional television signal applied to the input terminal 1 which comprises negative polarity synchronizing signal NS and picture signal V. After passing through the synchronizing signal eliminator 21 as shown in FIG. 4, the synchronizing signal NS in the television signal as shown in FIG. 5–*a* is sliced and a wave form as shown in FIG. 5–*b* is obtained at the output of the circuit 21. On the other hand, the synchronizing signal separating circuit 22 separates the negative polarity synchronizing signal NS and a wave form such as the curve FIG. 5–*c* is produced. The modulator 24 is to modulate the burst wave having a wave form shown in FIG. 5–*d* produced by the burst wave oscillator 23 with said wave form of FIG. 5–*c*, and also to reverse the polarity of thus modulated synchronizing signal and to obtain wave form such as FIG. 5–*e*. By adding the wave form as shown FIG. 5–*e* to that of FIG. 5–*b* by means of adder 25 a processed wave form as shown in FIG. 5–*f* is obtained. It is necessary as described before to limit the maximum amplitude of the positive polarity synchronizing signal in a level below the maximum of the picture signal. If the burst wave, which was superposed on the synchronizing signal in order to facilitate necessary discrimination at the receiving end, is modulated with sound signal, then such sound signal can be transmitted simultaneously with the above explained processed television signal, as will be explained in detail hereinafter.

In order to improve $S/N$ ratio in transmission in frequency modulation an emphasizing transmission means is effectively employed in accordance with the invention as described above.

In an emphasizing transmission of a television signal, interfering noise power can be expressed by $$\frac{1}{m^2}\int_0^{f_2}\omega(f)\cdot W(f)\cdot\frac{f_2+mf_0^2}{f_2+\frac{1}{m}\cdot f_0^2}\,df \quad (1)$$

while similar noise power when such an emphasizing means is not provided thereto is given by $$\int_0^{f_2}\omega(f)\cdot W(f)\,df \quad (2)$$

where, $\omega(f)$: noise power distribution function of satellite circuit.

W($f$): noise weighing factor of monochrome television system.

$f_0$: center frequency of emphasizing circuit.

$f_2$: maximum transmission frequency of picture signal via satellite circuit.

$m$: degree of emphasis in db.

Therefore, the improvement of $S/N$ by means of said emphasizing transmission can be derived from Formulae 1 and 2 and is given by $$\frac{\frac{1}{m_2}\int_0^{f_2}\omega(f)\cdot W(f)\cdot\frac{f_2+mf_0^2}{f_2+\frac{1}{m}f_0^2}\,df}{\int_0^{f_2}\omega(f)\cdot W(f)\,df} \quad (3)$$

The noise distribution of the communication satellite is triangular shape characteristic in the frequency characteristic diagram, accordingly the noises distribute rather higher concentration in the high frequency range, and by applying said emphasis transmission means, the overall S/N improvement characteristics of the transmission system is as shown in FIG. 7.

FIG. 6 shows a circuit diagram of an embodiment of the preemphasizing circuit 3 to be used as a part of the transmitting equipment at the transmitting station. It was experimentally assured that by using the preemphasizing network as shown in FIG. 6 of the center frequency of 0.3 mc. and 14 db emphasis is applied, then the improvement of $S/N$ ratio by about 10 db is obtained.

FIG. 8 shows characteristic curves A and B of the compressor circuit 4 of the transmitting equipment and expandor circuit 12 of the receiving equipment respectively as well as wave forms of processed television signal (*a*), (*b*) and (*c*) at different stages. Since the preemphasizing circuit emphasizes high frequency components of the television signal, there will appear peaks as shown in FIG. 8–(*a*) at the points where a sudden amplitude variation occurred. In order to fully utilize the limited available frequency band width of the transmission path as explained before, the processed and emphasized television signal as shown in FIG. 8–(*a*) is now applied to compressor circuit 4 of FIG. 1 and compress the said peaks in the signal and the signal shown in FIG. 8–(*b*) is obtained.

The curve FIG. 8–(*a*) is an output signal from the preemphasizing circuit 3, this is for example a setup signal having maximum white level, and it shows a peak at a point where the abrupt amplitude variation occurred, in a certain case the ratio $l/m$ between the amplitude $l$ of such a peak pulse and the maximum white level $m$, both measured from reference point $r$, reaches as high as 14 db. If such a signal is transmitted by frequency modulation and if making said maximum white level to correspond to the maximum frequency deviation the portion of said peak pulse will become out of transmission band, and therefore the carrier signal will be lost at the corresponding part and noises will cause at the said fringe portion of the picture and resulting in a deterioration of the received picture quality.

It is apparent from the preceding descriptions that if the level of the peak pulse is made to correspond to the maximum frequency deviation of the frequency modulated carrier wave, then the frequency deviation for the major portion of the picture signal will be greatly reduced, causing a substantial decrease in $S/N$ ratio of the received picture signal.

According to the invention, by the reason as described above, said output signal from the preemphasizing circuit shown FIG. 8–(*a*) is fed to compressor circuit 4 having characteristics as shown by the curve A while clamping the pedestal level at a certain reference level thereby the output signal of the compressor 4 as shown FIG. 8–(*b*) is obtained in which the peak pulse portion is substantially suppressed. This wave will be received and expanded at the receiving equipment by expandor circuit 12 of the character of curve B, and the signal of FIG. 8–(*c*) is reproduced.

For instance, a signal having said peak pulse of said $l/m$ ratio of 14 db is compressed by the compressor 4 and by the compression, $l/m$ ratio of 3.25 db is obtained. In this compression, it is now made possible to allocate the majority of frequency deviations in the frequency modulated wave for the major portions of the picture signal, while avoiding carrier elimination caused by peak pulse, and it was ascertained an improvement of the $S/N$ ratio by about 3 to 4 db.

It should be noted here that such a compression of the peak pulses will inevitably cause cancellation of emphasizing effect at the abrupt amplitude varying point and moreover, it should cause deterioration in $S/N$ ratio at such a fringe portion of the picture, however, such a reduction of $S/N$ ratio in fringe portion of the television picture exerts very little or substantially no effects to human eyesight and therefore the transmitted picture quality is not effected by said compressing transmission.

FIG. 9 illustrates an embodiment of such compressor circuit wherein a processed and emphasized television signal having its pedestal level clamped at a certain reference level, as shown in FIG. 8(*a*) is led to an amplifying transistor $T_1$ through the input terminal 4*a* and then to a common connecting point of diodes $D_1$ and $D_2$, which are connected in reverse direction. The other terminal of the diode $D_1$ is supplied with a bias voltage from D.C. source of +20 v. through an emitter follower circuit consisting of transistor $T_2$. The base of the emitter follower circuit consisting of the transistor $T_2$ is connected to a series connection comprising a constant voltage diode $D_3$, and a potentiometer circuit $R_1$, $R_2$, so that the base voltage of the transistor $T_2$ may be adjusted and kept at a voltage within a certain predetermined range, i.e., from +5 v. to +15 v., by means of adjusting the moving tap of resistor $R_1$. The base voltage of the transistor $T_2$ thus adjusted is directly applied to the cathode of the diode $D_1$.

If setting said base voltage of the transistor $T_2$ and accordingly, the cathode voltage of $D_1$ at a voltage equal to +7 v., then those portions of the picture signal which exceeds +7 v. will be clipped by the diode $D_1$.

On the other hand, the other terminal of diode $D_2$, is fed from the same D.C. source of +20 v. through another emitter follower circuit consisting of a transistor $T_3$ and another series connected circuit comprising a constant voltage diode $D_4$, and a potentiometer circuit $R_3$ and $R_4$ and thereby the anode voltage of the diode $D_2$ can be adjusted and kept at a voltage within a certain predetermined range, i.e., from +2 v.? to +7 v. If the anode voltage of the diode $D_2$ is assumed to be kept at +5 v., then those portions of the television signal which are lower than +5 v. will be clipped thereat due to the fact that the polarity of the diode $D_2$ is opposite to that of the diode $D_1$.

By setting the above mentioned operating point, at the input terminal of amplifier consisting transistor $T_4$ a signal having maximum amplitude of 2 v. can be applied. What is shown in FIG. 9 is an embodiment of essential operating principle of the compressor circuit, and in order to obtain such characteristics as shown by the curve A in FIG. 8, additional clipping units consisting of a plurality of diode circuits such as $D_1$ and a plurality of diode circuits such as $D_2$ may be provided, and combining these circuits with bias voltage sources and by providing necessary resistors of different value among the said circuits between each diode and its bias source.

The signal thus shaped will now be applied to the modulator 5 (FIG. 1) for frequency modulation of the carrier wave, while clamping the pedestal level of the signal at a fixed voltage so that said pedestal level always corresponds to a fixed frequency in the modulated carrier wave.

FIG. 10 shows preferred correlations between the amplitude of the transmitting signal and the frequency deviation of the carrier wave, wherein the pedestal level P made to correspond to a fixed frequency say 1.7 mc. from the lower end of the given frequency band width of 8 mc., thereby the entire amplitude range of thus preemphasized and compressed television signal can be transmitted by frequency modulated carrier wave of said range, and the modulated wave modulated by the maximum amplitude of the picture signal lies in the transmission band because the amplitude of the signal is compressed in a predetermined range. With the above arrangement, even if the mean value of the picture signal is varied, the frequency deviation of the carrier wave is kept within the given frequency band width without any failure, and accordingly the invention provides a fully utilization of the given limited transmission band width.

The frequency modulated carried wave thus produced is now transmitted through the transmitter 6 and transmitting antenna TA. The transmitted wave is relayed and retransmitted by satellite.

Thus processed transmitted television signal is received by the receiving equipment as shown in FIG. 2, wherein RA is a receiving antenna and 9 a radio frequency receiving and intermediate frequency amplifying stage. In case of receiving the television signal repeated by the SYNCOM III satellite, in order to obtain a $C/N$ level higher than 12 db as described in the preceding, the frequency band width of the intermediate frequency amplifier in stage 9 is set to be 8 mc.

Thus received frequency modulated carrier wave is detected by demodulator 10, and the synchronizing signal in the detected signal is separated by a synchronizing signal separator 11, and 12 is an expandor circuit to recover those portions of the peak pulses which were compressed by the compressor circuit 4 prior to transmission at the transmitting station. The clamping circuit 13 is to hold the pedestal level of the television signal at a certain predetermined level, and the deemphasizing circuit 14 reproduces the processed television signal from the clamped and emphasized television signal. The wave form equalizer 15 is to compensate for deformations in wave form of the transmitted signal due to clipping of peak pulses at the transmitting end. The negative polarity synchronizing signal processor circuit 16 is to insert synchronizing signal having an opposite polarity to that of the picture signal i.e. negative polarity synchronizing signal to the picture signal by means of properly separating synchronizing signal out of transmitted signal and reversing the polarity thereof.

A noise killer circuit 17 eliminates impulsive noises mixed in the picture signal during transmission thereof, and 19 is an output terminal of the receiving equipment supplying thus processed and reproduced television signal.

According to the invention it is preferable to provide all devices described in the foregoing, however, such devices as the expandor circuit 12, the wave form equalizer 15, and the noise killer circuit 17 may be omitted in certain cases.

The details of the receiving equipment will now be explained more fully hereinafter.

After the reception of thus transmitted signal via receiving antenna RA the signal is amplified in amplifier 9 and demodulated by the demodulator 10. The wave form of the output signal from the demodulator 10 is similar to that of the output signal from the compressor circuit 4 in the transmitting equipment as shown in FIG. 8–(*b*). At first the synchronizing signal is separated from said demodulator output signal.

According to the invention, the synchronizing signal separator 11 detects the burst wave (for instance 2 mc. wave) superposed on the positive polarity synchronizing signal and thereby discriminate each position of synchronizing signal in the television signal.

FIG. 11 shows a preferable embodiment of such synchronizing signal separator 11. A processed television signal having positive polarity synchronizing signal and such wave form as shown in FIG. 3–(*a*) is fed through input terminal 27 to band-pass filter 28 passing only the burst wave frequency of 2 mc. The burst wave frequency component of the signal thus separated is then applied to an envelope detector 29 to obtain an envelope signal having amplitude only at those portions where the burst wave of 2 mc. wave is present. The obtained envelope signal is then utilized to trigger an automatic frequency control (AFC) oscillator 31 via a gate circuit 30 and also to produce a vertical synchronizing signal via an integrating circuit 18. The frequency of the AFC oscillator 31 is equal to the horizontal synchronizing frequency, 15.75 kc. in this embodiment of the invention. It was explained by an example of a 2 mc. burst wave frequency, however, that the frequency is not limited to 2 mc. only but other frequencies can be used without any objection.

It should be noted that as the available transmission path is a narrow limited band width by satellite, the burst wave frequency must be lower than the maximum frequency of the picture signal. Therefore a 2 mc. component of the picture signal also appears at the output of the envelope detector 29 and may produce a false synchronizing signal which might lead to a misoperation of the receiving equipment. According to the invention, the output from the AFC oscillator 31 is fed back to the gate circuit 30 so that only, the correct horizontal synchronizing signal may be produced. The vertical synchronizing signal may be derived from the integrating circuit 18.

The demodulated television signal from the demodulator 10 is also fed to low pass filter 32, which rejects high frequency components of video signal including burst wave frequency components. The output from low pass filter 32 is then applied to second gate circuits 33. The output from the AFC oscillator 31 is also applied to second gate circuits 33 in conjunction with said vertical synchronizing signal, thereby complete synchronizing signal is derived from the output signal of the low pass filter 32. The output synchronizing signal from the gate circuits 33 is supplied to clamping circuits 13 and synchronizing signal processor circuits 16, in which the synchronizing signal is inserted to video signal so that it has an opposite polarity to that of the picture signal.

The demodulated television signal from the demodulator 10 is also led to the expandor circuit 12 as shown in FIG. 2, wherein such peak pulses which are compressed at the transmitting equipment are expanded while the pedestal level of the television signal is kept at a constant predetermined voltage in the expandor circuit 12. The characteristics of the expandor circuit 12 is for instance as shown by the curve in FIG. 8–B, and the output television signal from the expandor circuit will have a wave form as shown in FIG. 8–(*c*).

The expandor circuit 12 can be omitted, since if the expandor circuit is not provided, the fringe portion of reproduced television picture may be slightly blurred, however such effect can be corrected by a simple means and practically does not give any significant disturbance for the human eyesight.

The output signal from the expandor circuit 12 is then led to the deemphasizing circuit 14, where the television signal preemphasized at the transmitting end is returned to its original wave form. FIG. 12 shows an embodiment of such a deemphasizing circuit 14.

The output signal from the deemphasizing circuit is led to a wave form equalizer 15 in the preferred embodiment of the invention, however such a equalizer is not essential to the invention, and it can be omitted under certain conditions. In the case when the expandor circuit 12 is omitted as described above, the wave form equalizer 15 is useful in order to reshape the deformation in the television signal. As the wave form equalizer, a suitable conventional peaking circuit or crispening circuit can be used.

Then the picture signal thus expanded and deemphasized is led to the negative polarity synchronizing signal processor 16 as shown in FIG. 2 in order to insert a conventional negative synchronizing signal to the signal. FIG. 13 shows an embodiment of the negative polarity synchronizing signal processor circuit 16, in which a synchronizing signal eliminating circuit 37 separates positive polarity synchronizing signal included in the incoming processed television signal through the input terminal 35 by gating it with the said separated synchronizing signal in the synchronizing signal separator 11 of FIG. 2 via input terminal 36. The television signal, from which the synchronizing signal is thus eliminated, is then led to the synchronizing signal inserting circuit 39 and said synchronizing signal coming from the synchronizing signal separator 11 inserted via the synchronizing signal amplifier 38.

In the synchronizing signal inserting network, the synchronizing signal is combined with the picture signal in an opposite polarity with that of the picture signal especially lower than the black level thereof. Thus processed output signal from the output terminal 40 has wave form of a conventional television signal in which thus synchronizing signal is located below the black level of the picture signal. With this process, separation of the synchronizing signal from television signal derived from the output terminal 40 can be carried out by means of conventional amplitude separation.

In other words, the standard television signal is now obtained and such television signal may be used for conventional television signal transmission system for broadcasting and reproducing. A noise killer circuit 17 can be utilized prior to the output terminal in order to suppress impulsive noises in the signal.

FIG. 14 shows an embodiment of said noise killer circuit, in which impulsive noises included in the television signal coming from the input terminal 41 are at first detected by a noise detector 42. The noise detector 42 is an amplitude detector adapted to detect and suppress those pulses usually impulsive pulses, having amplitudes exceeding a certain predetermined level, and thus discriminated pulses are shaped by means of a wave shaper 43 in order to utilize them as the gate pulses to gate the first and the second gate circuits 44 and 45.

The television signal arriving at the input terminal 41 is led directly to the first gate circuit 44, whilst said television signal is also led to the second gate circuit 45 through a delay circuit 46 which provides the television signal with a time delay equal to one horizontal period, thereby the second gate circuit 45 is supplied with the television signal delayed from those fed to the first gate circuit 44 by one horizontal period. When one of said gate pulse is led to the first and the second gate circuits 44 and 45 respectively, the portion of the television signal where said impulsive noise is included will be eliminated at the first gate 44, whilst such portion of thus delay television signal in the gate circuit 45 which corresponds to the noise portion of the preceding horizontal period is derived out. Then by combining the output signals from the gate circuits 44 and 45 in adder 47, a corrected picture signal without such impulsive noise portion may be obtained via output terminal 48 with good approximation to the original signal. Since the adjacent picture elements of the picture signal in adjacent horizontal lines are correlated each other very closely, said process of manipulation of the television signal will not give any practical influence to the human eyesight, and considerable improvement in the picture quality can be obtained by eliminating said impulsive noises.

It should be noted here that the probability of occurrence of two impulsive pulses in two adjacent horizontal scanning lines and at the same location of the picture is extremely small and accordingly the interference due to impulsive noises can be almost completely eliminated by means of said noise killer network.

Therefore, according to the invention, by applying described processing to the television signal, the television signal transmitted over a great distance through a narrowly limited frequency band width available by satellite can be reproduced almost perfectly equal to their original wave form.

FIG. 15 shows whole system diagram of the television signal transmission relayed by space satellite, SYNCOM III, while utilizing a separate channel for transmitting the sound signal as described in the foregoing. This system was actually used for live television broadcasting of the seventeeth Olympic Games held in Tokyo in 1964 over the world. In this figure, 49 is a transmitter in NHK Broadcasting Center, 50 Kokubunji Radio Research Laboratories, 51 Tsukuba Repeating Station, 52 Kashima Ground Station, 52–A a transmitting antenna located in the Ground Station 52, 53 CYNCOM III, 54–A a receiving antenna, 54 Point Mugu Ground Station, 55 NHK Signal Processing Center at Point Mugu Station, 56 a repeating station for submarine cable communication at the sending end, 57 a submarine cable, and 58 a repeating station for submarine cable at the receiving end. The device shown in FIG. 1 was located in stations from the NHK Broadcasting Center 49 to the transmitting antenna 52–A, and the major portions of devices shown in FIG. 2 were located in NHK Signal Processing Center 55. The sound signal was transmitted by way of the submarine cable and then combined with television signal comprising picture and synchronizing signals at the Signal Processing Center 55 for broadcasting a monochrome television signal. The picture signal was taken by means of a color television camera in brightness signal separation, and then transmitted across the Pacific by way of the communication satellite, SYNCOM III.

In the case of above described television signal transmission across the Pacific, the sound signal of the program was transmitted through a separate channel as shown in FIG. 15. Accordingly, there was noticed a difference in time delay in transmission between the television signal and the sound signal of the program due to difference of their transmission characteristics and in order to compensate for such difference in the two signals transmitted through two separate channels additional devices were required either in transmitting or in receiving station. In addition, if failure in the sound channel happens the entire broadcasting of the television program may be interrupted despite the fact that television signal transmitting channel is in perfect operating condition.

In view of the above inconveniences in the system using two separate channels for transmitting picture and sound signals of a television program, this invention has for its further feature to mitigate these disadvantages and makes it possible to transmit both television and sound signals simultaneously through a common transmission channel even when the frequency band width available in the channel is narrowly limited such as relayed by satellite.

FIG. 16 is a block diagram showing an essential portion of an embodiment of the above system of the invention, for simultaneous transmission of television and sound signals, wherein a synchronizing signal separator 101 is supplied with standard television signal as shown by the curve *b* of FIG. 3. After separating the synchronizing signal thereof by the synchronizing signal separator 101, said television signal is separated into two signals, the picture signal 102 and the synchronizing signal 103, which correspond to the upper and lower portions of the standard television signal with respect to the black level thereof.

The synchronizing signal 103 thus separated is fed to a gate 105 through a phase reversing circuit 104, a high frequency sinusoidal wave is gated out so as to produce a burst signal 108 to be led to an adder 109. The high frequency sinusoidal wave to be applied to the gate 105 is generated at the oscillator 107 and then frequency modulated at a frequency modulator 106 with a low frequency signal such as television sound signal. After adding the burst wave signal 108 to the picture signal at the adder 109, a desired processed television signal having a positive polarity synchronizing signal therein, as shown by the curve *a* of FIG. 3, is obtained. The frequency of the oscillator 107 is varied in response to the conditions of the transmission system.

If the frequency band width of the transmission path available for the system is wider than the frequency band width of the picture signal, then the frequency of the burst wave can be taken outside of the frequency band of the picture signal, thereby the synchronizing signal can be easily separated from the television signal by means of an arbitrary filter at the receiving end. However, in the transmission path to which the system of the invention is to be applied, the frequency band width available for transmission of the signal is usually limited to a narrow range, and the frequency deviation of the burst wave has to be in the common frequency band with the picture signal frequency.

FIG. 17 illustrates an embodiment of a receiving equipment for receiving such television signal with simultaneous sound transmission, in which a band-pass filter 111 is to pass the burst wave frequency and its side band frequencies, and hence when the input signal 110′ is applied to the band-pass filter 111, its burst signal will pass therethrough to its output terminal. The burst signal thus obtained is then detected by means of an envelope detector 112 and the synchronizing signal is reproduced. The output signal from the envelope detector 112 is passed through a horizontal gate circuit 113, which gates the horizontal fly-back period, and then supplied to the horizontal automatic frequency control (AFC) circuit 114. The main function of the horizontal AFC circuit 114 is to improve the stability of the horizontal scanning against interfering noises, as in the case of conventional television receiving equipment, however, in the system of the invention, this horizontal AFC circuit 114 also acts in cooperation with the gate circuit 113 to prevent those frequency components of the television signal which coincide with the burst signal frequency from interfering the horizontal synchronization in the reproduced television pictures.

According to the invention, the burst wave frequency is selected near the highest frequency of the picture signal thereby those frequency components of the television signal which are close to the burst signal frequency is usually very weak and hence the interference of the picture signal on the detected synchronizing signal in the horizontal AFC circuit 114 may be almost completely eliminated by merely passing the input signal 110′ through the band-pass filter 111. Nevertheless, due to the use of the gate circuit 113 in addition to said band-pass filter 111, once the horizontal AFC circuit 114 is pulled into a proper synchronized condition, then such a synchronism will not be broken by any frequency component of the picture signal and more perfect reproduction of the synchronizing signal can be obtained. Similar networks may be applied to the circuits for vertical synchronization, however, for practical purposes, it is sufficient to integrate and shape the output signal from the envelope demodulator 112 by means of an integrating circuit 116 as shown in FIG. 17. By combining the output signal from the horizontal AFC circuit 114 and the output signal from the integrating circuit 116 at a synchronizing signal generator 117, a synchronizing signal which in synchronism with those of transmitting end of the system may be obtained.

On the other hand, in the processor 118, the input signal 110′ is treated in the same manner as described as adding a blanking signal, clamping and clipping by means of blanking and a horizontal driving signal supplied from the synchronizing signal generator 117, thereby the burst signal thereof is eliminated and thereafter the negative polarity synchronizing signal produced at the synchronizing signal generator 117 is added into thus processed television signal. The output signal 119 from the processor circuit 118 is now a proper television signal of standard wave form.

The reproduction of sound signal will be now explained in further detail. The input television signal 110′ is branched and led to a gate circuit 122. The gating pulse of the gate circuit 122 is produced at a gate pulse generator 121 by using a pulse led from another gate pulse generator 115 as the trigger pulse thereof. The repetition frequency of the gate pulse of the gate circuit 122 is made equal to the number of horizontal scanning lines. It is preferable to make the duration of the gate pulse for the gate circuit 122 as narrow as that of the equalizing pulse in order to decrease buzz noises in the demodulated sound signal due to the influence of the vertical synchronizing signal. The output signal from the gate circuit 122 is demodulated by means of a FM demodulator 123, then the output signal from the FM demodulator 123 is equivalent to a signal made by sampling the sound signal at an interval equal to the horizontal scanning period. Therefore, the sound signal 125 can be obtained by passing said output signal from the FM demodulator 123 through a low-pass filter 124, which passes frequencies up to one half of the frequency of the horizontal scanning.

The noise frequency distributing characteristics of the input television signal 110′ is a so-called triangle shape distribution, and the noise level is higher in the range of higher frequencies. Therefore, the synchronizing signal wave form produced by filtering the burst wave through the band-pass filter 111 and detecting it with the envelope detector 112 is comparatively more susceptible to noises.

In order to improve the system shown in FIG. 17, a part of the equipment of FIG. 17 can be modified as shown in FIG. 18. Since the processor 118 and the circuits for reproducing the sound signal are the same with those of FIG. 17, such circuits are not shown in FIG. 18. In the arrangement of FIG. 18, the burst signal is used to obtain horizontal and vertical synchronizing signals in the same manner as in the arrangement of FIG. 17, however, this signal is not used directly for synchronizing signal generator 117 in FIG. 18. In the arrangement of FIG. 18, said two pulses are used as trigger pulses for producing the blanking signal from blanking signal generator 126. On the other hand, the input signal 110' is branched and led to the low-pass filter 127 in order to eliminate burst signal frequency component thereof. Accordingly, in the output signal from the low-pass filter 127, the burst wave is substantially eliminated and only the pedestal component of the burst signal may appear as shown in FIG. 19–*b*. This pedestal component obtained from the low-pass filter 127, is fed to the gate circuit 128, and by gating out only the fly back blanking pulse portion from the signal, thereby the picture signal is eliminated and a synchronizing signal having a wave form of standard synchronizing signal can be obtained. By using the synchronizing signal thus obtained to synchronize the synchronizing signal generator, a very stable synchronizing signal having proper waveform will be attained. The stabilizing effects by means of the horizontal AFC circuit 114 in the case of the arrangement in FIG. 17 will be carried out within the synchronizing signal generator 117 in FIG. 18.

If most of the noises interfering the transmitting television signal are of impulsive nature, the arrangement of FIG. 17 results in a more stable synchronization compared with the arrangement of FIG. 18. It is not necessarily required to make the amplitude of the burst signal comparable with that of picture signal, as shown in the curve *a* of FIG. 3. It is not required to make the form of the envelope of the burst signal to coincide with that of the standard synchronizing signal. In other words said burst wave for transmission can have various characteristics.

The oscillator 107 of FIG. 16 may be an ordinary oscillator, however, it is preferable to use a synchronous oscillator in synchronism with the horizontal synchronizing signal in order to decrease disturbance of the voice band signal produced by the beat action between said oscillation and the horizontal synchronizing signal.

According to the system of the invention, a high quality television and sound signal transmission is possible by relaying with space satellite, and by means of very narrowly limited transmission path available. The main effects of the system of the invention obtained are:

(1) By converting the polarity of the synchronizing signal in the television signal to coincide with that of the picture signal therein, fully utilization of the frequency deviation of frequency modulated wave by the maximum amplitude of the picture signal being possible, moreover enabling simultaneous transmission of sound signal via same transmission channel.

(2) By the preemphasizing means and compressor means large frequency deviations can be accommodated for the major portion of the picture signal.

(3) By clamping a certain predetermined level of the television signal to be always a predetermined constant frequency in the frequency modulated wave, maximum utilization of frequency deviation within the limited available transmission path can be obtained.

Therefore in accordance with the system of the invention considerable improvement of the $S/N$ ratio of the transmitted television signal is obtained, and thus highly improved picture quality can be obtained.

It should be noted here that by choosing a suitable frequency of the burst wave of the positive polarity synchronizing signal the color television signal of NTSC system can also be transmitted in accordance with the system of the invention.

What we claim is:

1. A television signal transmission system transmitting a television signal on a frequency modulated carrier wave having a predetermined bandwidth wherein up to 100% of the bandwidth is available for video signal information; said system comprising means receiving a series of video amplitude modulated signals of one general polarity and synchronizing signals of an opposite polarity relative to a common reference; said means changing the polarity of one of the video and synchronizing signals so that said video and synchronizing signals are of the same polarity relative to a common reference, confining the synchronizing signal amplitudes below the maximum video signal amplitude, and superposing a detectable characteristic on each synchronizing signal which distinguishes it from video information characteristics; frequency modulating means generating signals within a predetermined bandwidth coupled to receive the television signals from said first mentioned means and including means for controlling said frequency modulating means to generate a predetermined frequency corresponding to a certain amplitude level of the received television signal; a transmitter coupled to receive the signal generated by the frequency modulator and to radiate frequency modulated television signals accordingly.

2. A system as set forth in claim 1 wherein said first mentioned means includes a burst generator for superposing on the synchronizing signal a plurality of cycles of a burst wave at a predetermined frequency to give the synchronizing signal a characteristic which distinguishes it from the picture signals, said burst wave when superposed having a maximum amplitude less than the maximum video signal amplitude.

3. A system as set forth in claim 2 wherein the burst wave frequency is selected near the highest frequency of the video signal.

4. A system as set forth in claim 2 wherein said system further includes additional means for frequency modulating the burst wave with an audio signal.

5. A system as set forth in claim 1 wherein said first mentioned means comprises preemphasizing means for emphasizing the higher frequency components of the television signal before it is fed from said first mentioned means.

6. A system as set forth in claim 5 wherein said first mentioned means further comprises compressor means connected to receive the emphasized signal, said compressor means compressing the peaks of the received signals to within predetermined maximum amplitude limits so that the percentage of the predetermined bandwidth needed to transmit the video signal peaks is reduced.

7. A system as set forth in claim 6 wherein said first mentioned means and said modulating means include a clamping means to clamp the midlevel amplitude of the compressed television signal to correspond with the center frequency of the predetermined bandwidth.

8. A television signal transmission system transmitting a television signal on a frequency modulated carrier wave, comprising means receiving a series of video amplitude modulated signals of one general polarity and synchronizing signals of an opposite polarity relative to a common reference; said means changing the polarity of one of the video and synchronizing signals so that said video and synchronizing signals are of the same polarity relative to a common reference, confining the synchronizing signal amplitudes below the maximum video signal amplitude, preemphasizing means receiving the signals from said first mentioned means and emphasizing the higher frequency components thereof, and compressor means receiving the emphasized signals and compressing the signal peaks, frequency modulator means having a predetermined bandwidth deviation receiving the compressed signals and frequency modulating the carrier in accordance with the amplitude of the received compressed signals, and a transmitter receiving the frequency modulated signal and radiating a signal accordingly.

9. A system as set forth in claim 8 wherein a clamping means is provided to clamp a predetermined signal amplitude received by the frequency modulator to a level which correspondingly controls the modulator to generate a signal at a predetermined frequency.

10. A television receiver system adapted to receive a frequency modulated carrier having a predetermined bandwidth with the synchronizing signal frequency deviation being less than the video signal frequency deviation and the video signal frequency deviation being up to 100% of the bandwidth, said receiving system comprising means for receiving the frequency modulated carrier wave and for generating an amplified demodulated signal which includes a series of video and synchronizing signals having the same polarity relative to a common reference with the video signal amplitude greater than the synchronizing signal amplitude and the synchronizing signal including a characteristic which distinguishes it from the video signal, synchronizing signal separator means coupled to the demodulator output for detecting the distinguishing characteristic of the synchronizing signal and producing a signal corresponding to the synchronizing signal, means receiving the demodulated signal and feeding a synchronizing signal processing means, said processing means also being coupled to receive a signal from the synchronizing separator for replacing the synchronizing signals of same polarity as the video signals with synchronizing signals of an opposite polarity.

11. A system as set forth in claim 10 wherein said means receiving the demodulated signal and feeding said synchronizing signal processing means includes a deemphasizing means for deemphasizing the high frequency components of the demodulated television signal.

12. A system as set forth in claim 10 wherein the characteristics of the synchronizing signal is a superposed burst wave of predetermined frequency and wherein said synchronizing signal separator includes a band pass filter which passes the predetermined burst wave frequency, an envelope detector means to produce a corresponding synchronizing signal in response to a burst wave received from said filter.

13. A system as set forth in claim 12 wherein an AFC oscillating means is coupled to receive a gated synchronizing signal from the envelope detecting means and to generate an AFC signal, gate means receiving and controlled by the AFC oscillating means output, a low pass filter connected from the band pass filter input to the gate means input, said gate means being on when an AFC signal is received so that the synchronizing signal at the low pass filter output is passed through the gate output.

14. A system as set forth in claim 12 wherein the burst wave is frequency modulated to carry an audio signal, said system further including a sound signal detection system coupled for demodulating the burst wave to produce a sound signal.

15. A system as set forth in claim 10 wherein said means receiving the demodulated signal and feeding said synchronizing signal processing means includes an expander means for expanding the video amplitude peaks.

16. A system as set forth in claim 15 wherein a clamping means is coupled to maintain the video signal within the expanding means at a predetermined level so that only the video peaks are expanded.

17. A system as set forth in claim 10 wherein a noise killer means is provided to receive the television signal from the processing means and suppress impulse noises therein.

18. A system as set forth in claim 17 wherein the noise killer means includes a noise detector means which controls a wave shaper means to generate a signal corresponding to the impulsive noises, a first gate controlled by said wave shaper means for receiving incoming signals, a second gate for receiving the incoming signal delayed one horizontal sweep period, said wave shaper means also controlling said second gate, adder means receiving the outputs of said first and second gates for combining the signals therefrom and generating at its output a corrected signal without noise.

19. A television transmission and receiving system for broadcasting television signals over great distances including a transmission system, a receiving system, a satellite in orbit having a transponder for receiving the television signals from the transmission system and transmitting corresponding signals to the receiving system, said transmitting system transmitting the television signal on a frequency modulated carrier wave having a predetermined bandwidth wherein up to 100% of the bandwidth is available for video signal information, said bandwidth being selected to correspond with a suitable operational bandwidth for said transponder which permits the carrier to noise ratio to be of suitable small level, said transmission system comprising means receiving a series of video amplitude modulated signals of one general polarity and synchronizing signals of an opposite polarity relative to a common reference; said means changing the polarity of one of the video and synchronizing signals so that said video and synchronizing signals are of the same polarity relative to a common reference, confining the synchronizing signal amplitudes below the maximum video signal amplitude, and superposing a detectable characteristic on each synchronizing signal which distinguishes it from video information characteristics; frequency modulating means generating signals within a predetermined bandwidth coupled to receive the television signals from said first mentioned means and including means for controlling said frequency modulating means to generate a predetermined frequency corresponding to a certain amplitude level of the received television signal; a transmitter coupled to receive the signal generated by the frequency modulator and to radiate frequency modulated television signals accordingly, said receiving system comprising means for receiving the frequency modulated carrier wave from said transponder and for generating an amplified demodulated signal which includes a series of video and synchronizing signals having the same polarity relative to a common reference with the video signal amplitude greater than the synchronizing signal amplitude and the synchronizing signal including a characteristic which distinguishes it from the video signal, synchronizing signal separator means coupled to the demodulator output for detecting the distinguishing characteristic of the synchronizing signal and producing a signal corresponding to the synchronizing signal, means receiving the demodulated signal and feeding a synchronizing signal processing means, said processing means also being coupled to receive a signal from the synchronizing separator for replacing the synchronizing signals of same polarity as the video signals with synchronizing signals of an opposite polarity.

References Cited

UNITED STATES PATENTS

| | | | |
|---|---|---|---|
| 2,350,902 | 6/1944 | Kallmann | 178—5.6 |
| 3,064,075 | 11/1962 | Hurford | 178—5.4 |
| 3,288,930 | 11/1966 | Johnson | 179—1 |

ROBERT L. GRIFFIN, Primary Examiner

ROBERT L. RICHARDSON, Assistant Examiner

U.S. Cl. X.R.

178—5.6, 7.1, 69.5; 325—4, 45